United States Patent
White

(10) Patent No.: US 8,435,483 B2
(45) Date of Patent: *May 7, 2013

(54) METHOD FOR MAKING AMMONIUM METATUNGSTATE

(75) Inventor: John R. White, Huntsville, AL (US)

(73) Assignee: TDY Industries, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/850,025

(22) Filed: Aug. 4, 2010

(65) Prior Publication Data

US 2011/0002840 A1    Jan. 6, 2011

Related U.S. Application Data

(63) Continuation of application No. 12/189,863, filed on Aug. 12, 2008, now Pat. No. 7,794,686.

(51) Int. Cl.
*C01G 41/02* (2006.01)

(52) U.S. Cl.
USPC .................................. 423/594.13; 423/593.1

(58) Field of Classification Search ............... 423/593.1, 423/594.13
See application file for complete search history.

(56) References Cited

U.S. PATENT DOCUMENTS

| | | | |
|---|---|---|---|
| 2,703,789 A | 3/1955 | McKinley et al. | |
| 3,175,881 A | 3/1965 | Chiola et al. | |
| 3,231,329 A | 1/1966 | Weiss et al. | |
| 3,451,764 A | 6/1969 | MacWilliams et al. | |
| 3,464,783 A | 9/1969 | Patzauer | |
| 3,472,613 A | 10/1969 | Hay et al. | |
| 3,591,331 A | 7/1971 | Chiola et al. | |
| 3,857,928 A | 12/1974 | Kim et al. | |
| 3,857,929 A | 12/1974 | Quatrini et al. | |
| 3,936,362 A | 2/1976 | Vanderpool et al. | |
| 3,956,474 A | 5/1976 | Ritsko | |
| 4,283,257 A | 8/1981 | Vanderpool et al. | |
| 4,504,461 A | 3/1985 | Carpenter et al. | |
| 4,557,923 A | 12/1985 | Powers et al. | |
| 4,557,924 A * | 12/1985 | Kim et al. | 423/594.13 |
| 4,612,180 A | 9/1986 | Kim et al. | |
| 4,612,181 A | 9/1986 | Boyer et al. | |

(Continued)

OTHER PUBLICATIONS

Agency for Toxic Substances & Disease Registry. 4. Chemical and Physical Information, pp. 71-80 [online]. U.S. Department of Health and Human Services, 2004 [published on Sep. 8, 2004, retrieved on Nov. 1, 2011]. Retrieved from the internet:< URL: http://web.archive.org/web/20040908185851/http://www.atsdr.cdc.gov/toxprofiles/tp186-c4.pdf>.*

(Continued)

*Primary Examiner* — Stanley Silverman
*Assistant Examiner* — Richard M Rump
(74) *Attorney, Agent, or Firm* — K&L Gates LLP; Patrick J. Viccaro; John E. Grosselin, III

(57) ABSTRACT

A method for producing ammonium metatungstate from ammonium paratungstate includes preparing an ammonium paratungstate mixture including solid ammonium paratungstate and water. The mixture is contacted with a cation exchange material to lower a pH of the mixture to a pH range wherein metatungstate ion is stable and an insoluble tungstic acid is not formed. The pH of the mixture may be maintained in the pH range until the ammonium paratungstate mixture is converted into an ammonium metatungstate solution.

22 Claims, 3 Drawing Sheets

U.S. PATENT DOCUMENTS

| | | | |
|---|---|---|---|
| 4,612,182 | A | 9/1986 | Kim et al. |
| 4,612,183 | A | 9/1986 | Kim et al. |
| 4,626,424 | A | 12/1986 | Kim et al. |
| 5,882,620 | A | 3/1999 | Downey et al. |
| 2010/0040532 | A1 | 2/2010 | White |

OTHER PUBLICATIONS

O. Kirilekno, et al. "In Situ XAS and XRD Studies on the Structural Evolution of Ammonium Paratungstate During Thermal Decomposition" Eur. J. Inorg. Chem. 2005, 2124-2133.*

French, G. "A re-investigation of the thermal decomposition of ammonium paratungstate" Journal of Material Science. 16 (1981) 3427-3436.*

Liu, et al., "Study on New Method of the Preparation of Pure Ammonium Metatungstate (AMT) Using a Coupling Process of Neutralization-Nanofiltration-Crystallization", Journal of Membrane Science, Elsevier Scientific Publ. Company, Amsterdam, NL. vol. 240, 2004, pp. 1-9.

Office Action mailed Jan. 29, 2009 in U.S. Appl. No. 12/189,863.
Office Action mailed Jun. 10, 2009 in U.S. Appl. No. 12/189,863.
Advisory Action mailed Aug. 18, 2009 in U.S. Appl. No. 12/189,863.
Supplemental Advisory Action mailed Oct. 13, 2009 in U.S. Appl. No. 12/189,863.
Office Action mailed Dec. 18, 2009 in U.S. Appl. No. 12/189,863.
Notice of Allowance mailed Jun. 14, 2010 in U.S. Appl. No. 12/189,863.

* cited by examiner

METHOD FOR MAKING AMMONIUM METATUNGSTATE

CROSS-REFERENCE TO RELATED APPLICATIONS

This application claims priority under 35 U.S.C. §120 as a continuation of co-pending U.S. patent application Ser. No. 12/189,863, filed Aug. 12, 2008.

BACKGROUND OF THE TECHNOLOGY

1. Field of the Technology

The present disclosure is directed to a method involving the use of cation exchange material for producing ammonium metatungstate. According to certain embodiments of the method, a high purity crystalline ammonium metatungstate may be formed from ammonium paratungstate.

2. Description of the Background of the Technology

Ammonium paratungstate (APT) and ammonium metatungstate (AMT) are used as tungsten-containing raw materials in the catalyst industry. APT has limited solubility in water and typically has been converted to a more soluble peroxytungstate form for use in catalyst production. AMT is readily soluble in water, but is more expensive than APT because it is produced through difficult synthetic routes and with low yields. In the production of certain catalysts, aqueous solutions of the tungstate compounds are prepared and adsorbed onto alumina or another solid support. The adsorbed tungstate is then converted to a catalytically active tungsten, tungsten oxide, or tungsten carbide.

Several processes for producing AMT are disclosed in the prior art. U.S. Pat. No. 3,175,881 discloses one process for producing AMT from APT. APT is first calcined to drive off ammonia and water vapor. The calcined material is digested in 80° C. water, while preferably maintaining pH in the range of about 3.5 to 4.0. Additional ammonia is driven off during the digesting process, and water is evaporated to concentrate the solution. Insoluble tungsten oxide may be produced, and some APT remains unconverted. This process produces AMT in a yield of about 75%.

U.S. Pat. No. 3,591,331 discloses a method for producing AMT from an aqueous ammonium tungstate (AT) solution using a solvent. The method includes contacting an AT solution with an organic extractant solution. The extractant solution includes di-2-ethylhexylphosphoric acid and water insoluble hydrocarbon solvent, which extracts ammonium ions from the aqueous solution and lowers the pH to at least about 4.5. The aqueous solution is removed from the organic solution and heated for a least one hour. An essentially pure AMT reportedly is recovered, and the method also reportedly avoids the formation of APT. U.S. Pat. No. 3,857,928, however, reports that the organic phase used in the method tends to be unstable, and that up to 10% or more of the total solid product may be insoluble phosphor-tungstates.

U.S. Pat. No. 3,857,928 discloses a process for producing crystalline AMT from AT solution using an ion exchange column that contains a weak acid cation exchange resin. The AT feed solution is passed through the ion exchange resin until a pH of 3.5 is attained, at which point the effluent is collected. The collected effluent, which includes some metatungstate species, must be digested at a temperature of at least about 98° C. for at least about 5 hours to obtain substantially complete conversion of AT to AMT.

U.S. Pat. No. 3,857,929 discloses a batch process for producing AMT from AT. The process involves introducing a strong acid cation exchange resin containing sulphonic acid groups into an AT solution until a pH of about 3.5 is reached. The resin is removed by filtration, and the filtered solution is digested at about 98° C. for at least about 5 hours to obtain substantially complete conversion of AT to AMT. Crystallization of AMT may be carried out in a conventional manner.

A method for producing AT, APT, AMT, or hydrated tungsten trioxide is disclosed in U.S. Pat. No. 3,936,362. The process includes passing tungstate anions through an anion exchange membrane into an aqueous solution containing ammonium cations under the driving force of an electrical potential for a time sufficient to achieve a pH within the range at which the desired tungsten compound will form.

U.S. Pat. No. 3,956,474 discloses an AMT production technique in which an AT solution is digested in the presence of silica. Digestion takes place for at least 4 hours at a temperature of at least 98° C., followed by filtration to remove the silica from the AMT solution. Typically, the AMT solution includes about 0.4% by weight of silica after filtering.

U.S. Pat. No. 4,283,257 discloses a process for producing AMT from APT using an inert liquid permeable medium and direct electric current. APT is introduced in the anode chamber of an electrolytic cell, which is separated from the cathode chamber by an inert liquid permeable media. When direct electrical current is passed through the cell, ammonium ions migrate to the cathode compartment, resulting in an increased concentration of metatungstate in the anode chamber.

Digestion of calcined APT to form an AMT solution is disclosed in U.S. Pat. No. 4,504,461. The calcining process includes fluid bed roasting APT at 275° C. to 305° C. to form a precursor of AMT. The AMT precursor is slurried and digested for 30 to 120 minutes at 70° C. to its boiling point. The pH of the resulting slurry is between 3.0 and 4.0, and may be controlled in that range for consistent results.

U.S. Pat. No. 4,557,923 also discloses a method for producing AMT by roasting APT. APT is roasted at 275° C. to 300° C. for 10 to 20 hours. The roasted APT is added to a dilute solution of AMT having a pH of 3.6 to 4.6. The roasted APT is added at a rate suitable to maintain the pH of the AMT solution at 3.6 to 4.2. After addition of all of the roasted APT, the pH of the slurry is stabilized at 3.6 to 4.2. After dissolution, the resulting AMT solution is concentrated and insoluble materials are removed. Based on the $WO_3$ content of the starting APT, the reported yield of AMT may be at least about 97%.

U.S. Pat. No. 4,612,180 discloses a method involving first heating APT using microwave radiation. A relatively constant volume of an aqueous slurry of the microwave-heated APT is heated at about 80° C. to about 100° C. until slurry pH stabilizes at 5.8 to 6.8. The slurry pH is adjusted to 4.2 to 3.0 by addition of either dilute mineral acid or a strong acid cation exchange resin. The cation exchange resin is then removed from the pH-adjusted slurry, and the slurry is digested at 80° C. to 100° C. for 2 to 6 hours to form an AMT solution. The AMT solution is concentrated by evaporation, and crystalline AMT is obtained in a conventional manner. Based on the $WO_3$ content of the starting APT, the yield of AMT reportedly is at least about 93%.

U.S. Pat. No. 4,612,182 discloses an AMT production technique including heating APT at 100° C. to 250° C. for 1 to 8 hours to drive off at least some portion of ammonia and water from the APT. The heated APT is digested in water at 80° C. to 100° C. for 2 hours to 6 hours at relatively constant volume, while maintaining the pH at 4.2 to 3.0 by addition of ammonia, if necessary. A solution including AMT and water is formed. The AMT solution is concentrated and filtered, and AMT is crystallized. Based on the $WO_3$ content of the starting APT, the AMT yield of the technique is reportedly about 95%.

Despite the several existing techniques for producing AMT, a need has existed for a less expensive, high yield process for producing AMT.

SUMMARY

A method for preparing ammonium metatungstate includes preparing an ammonium paratungstate mixture that includes solid ammonium paratungstate and water. The ammonium paratungstate mixture is contacted with a cation exchange material to lower the pH of the mixture to within a pH range at which a metatungstate ion is stable and an insoluble tungstic acid is not formed. The pH is maintained within the pH range for a time period sufficient to convert substantially all of the ammonium paratungstate mixture to an ammonium metatungstate solution.

In certain non-limiting embodiments of a method according to the present disclosure, water included in the ammonium paratungstate mixture includes at least one of deionized water, distilled water, and double distilled water. According to another non-limiting embodiment of the method, ingredients including solid ammonium paratungstate and water having a temperature of 80° C. to 99° C. are mixed to provide the ammonium paratungstate mixture. According to yet another non-limiting of the method, the ammonium paratungstate mixture may be heated to a temperature of 85° C. to 95° C.

In certain non-limiting embodiments of the method, contacting the ammonium paratungstate mixture with a cation exchange material includes mixing the cation exchange material with the ammonium paratungstate mixture. In certain embodiments, the cation exchange material and ammonium paratungstate mixture are agitated.

In certain non-limiting embodiments, a pH range at which the metatungstate ion is stable and insoluble tungstic acid does not form is 2.0 to 5.0. In other embodiments, the pH range is 3.0 to 4.0, or 3.0 to 3.5.

According to an embodiment within the present disclosure, and without limitation, the cation exchange material includes a cation exchange resin. In a non-limiting embodiment, the cation exchange resin is a strong acid cation exchange resin. In other non-limiting embodiments, the strong acid cation exchange resin is at least one of a compound including a sulfonic acid group and a compound including a phosphonic acid group.

According to certain non-limiting embodiments, the cation exchange material may be separated from the ammonium metatungstate solution. Separating the cation exchange material from the ammonium metatungstate solution may include, for example, filtering the ammonium metatungstate solution.

Also, according to certain non-limiting embodiments of a method of the present disclosure, the ammonium metatungstate solution may be concentrated to form a concentrated ammonium metatungstate solution. Concentrating may include, for example, boiling the ammonium metatungstate solution. Without limitation, in one embodiment, the concentrated ammonium metatungstate solution is filtered to remove at least a portion of insoluble residual particles from the concentrated ammonium metatungstate solution.

In certain non-limiting embodiments, the concentrated ammonium metatungstate solution is dried. In a non-limiting embodiment, drying the concentrated ammonium metatungstate solution involves spray drying the concentrated ammonium metatungstate solution.

According to another non-limiting aspect of the present disclosure, a method for producing ammonium metatungstate from ammonium paratungstate includes mixing ingredients including solid ammonium paratungstate and water at a temperature of 80° C. to 99° C. to provide an ammonium paratungstate mixture. In certain non-limiting embodiments of the method, the water included in the ammonium paratungstate mixture includes at least one of deionized water, distilled water, and double distilled water. An amount of strong acid cation exchange resin is combined with the ammonium paratungstate mixture to adjust the pH of the mixture to 3 to 5 or, in certain embodiments, from 3.0 to 3.5. The ammonium paratungstate mixture is heated to 80° C. to 100° C. The pH of the ammonium paratungstate mixture is maintained within the range until substantially all of the ammonium paratungstate mixture is converted to an ammonium metatungstate solution. The cation exchange resin is separated from the ammonium metatungstate solution, and the ammonium metatungstate solution is concentrated to form a concentrated solution. The concentrated solution is filtered to remove at least a portion of insoluble particles from the concentrated solution, and is dried to obtain solid ammonium metatungstate.

BRIEF DESCRIPTION OF THE DRAWINGS

The features and advantages of the apparatus and methods described herein may be better understood by reference to the accompanying drawings in which.

The reader will appreciate the foregoing details, as well as others, upon considering the following detailed description of certain non-limiting embodiments according to the present disclosure.

DETAILED DESCRIPTION OF CERTAIN NON-LIMITING EMBODIMENTS

In the present description of non-limiting embodiments, other than in the operating examples or where otherwise indicated, all numbers expressing quantities or characteristics are to be understood as being modified in all instances by the term "about". Accordingly, unless indicated to the contrary, any numerical parameters set forth in the following description are approximations that may vary depending on the desired properties one seeks to obtain in the methods for producing ammonium metatungstate according to the present disclosure. At the very least, and not as an attempt to limit the application of the doctrine of equivalents to the scope of the claims, each numerical parameter should at least be construed in light of the number of reported significant digits and by applying ordinary rounding techniques. All ranges disclosed herein are to be considered inclusive of the end points.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Figure 1:
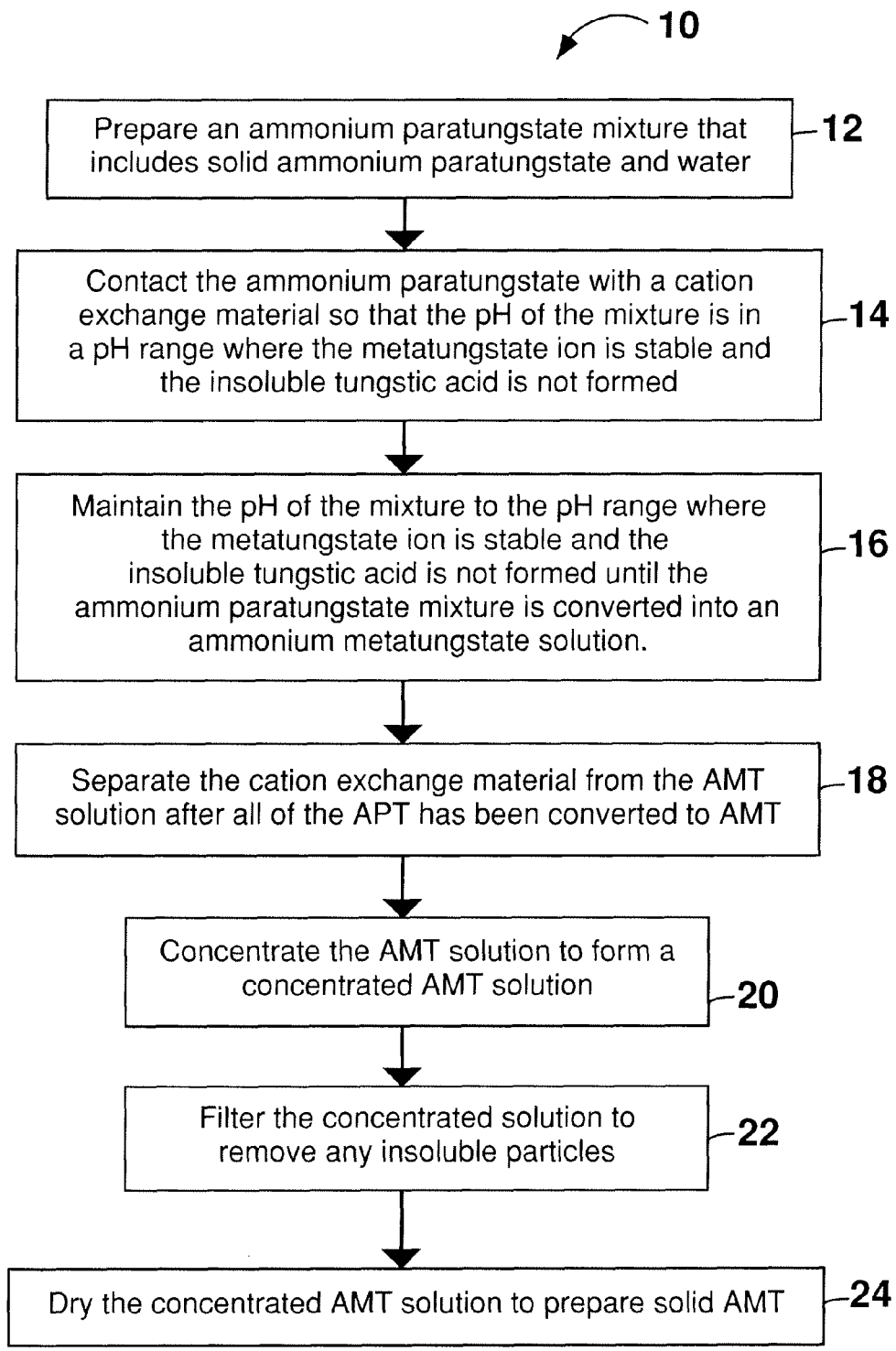
FIG. 1 is a flow chart of a non-limiting, exemplary embodiment of a method for producing AMT from APT according to the present disclosure.

Referring to FIG. 1, a flow chart illustrating a non-limiting embodiment of a method 10 for producing ammonium metatungstate (AMT) from ammonium paratungstate (APT) according to the present disclosure is presented. The method 10 includes a step 12 including preparing an ammonium paratungstate mixture (APT mixture) comprising solid APT and water. According to one non-limiting embodiment of the method 10, the solid ammonium paratungstate may be a high purity APT available commercially from Osram Sylvania, Towanda, Pa. USA. In certain non-limiting embodiments of the method 10, the purity of the final AMT product of the method 10 may be improved by using one or more of deionized water, distilled water, and double distilled water in the APT mixture. In certain non-limiting embodiments, the APT solution may include other liquid solvents, such as, for example, alcohols, or other liquid reagents that promote dissolution of APT in the APT mixture and that can be separated from the AMT product. In all cases, however, the liquid portion of the APT mixture is predominantly water. Given the relatively low solubility of APT in water, only a limited amount of APT dissolves into the water or the water-containing liquid portion of the APT mixture, and a low concentration APT solution is formed. Accordingly, step 12 provides an APT mixture comprising solid APT and a dilute liquid APT solution.

Figure 2:
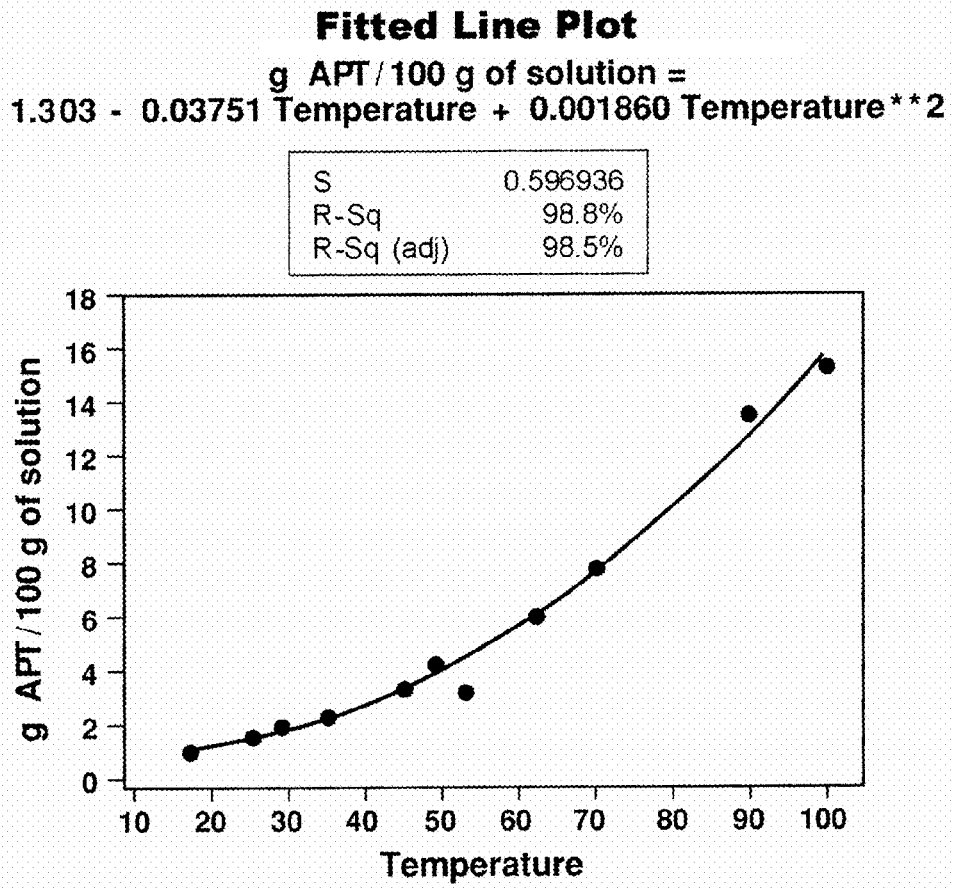
FIG. 2 is a plot of the solubility of APT in water as a function of temperature.

According to one non-limiting embodiment of the present method, to increase the solubility of the solid APT the water or water-containing liquid used to produce the APT solution is heated prior to and/or after adding the solid APT. FIG. 2 is a plot illustrating the solubility of APT in water as a function of temperature. According to one non-limiting embodiment of the present method, the water or water-containing liquid of the APT mixture is heated to 80° C. to 99° C. to increase the solubility of APT in the liquid portion of the APT mixture. In other non-limiting embodiments, the water or water-containing liquid of the APT mixture is heated to 75° C. to 99° C., or to 90° C. to 95° C., to increase the solubility of APT in the liquid portion of the APT mixture. In one non-limiting embodiment, water used to produce the APT solution is heated to a temperature near but below the boiling point to enhance APT solubility in the water. An ordinarily skilled practitioner will recognize that heating the water or water-containing liquid included in the APT mixture to any temperature above ambient temperature will assist in dissolving APT within the liquid. It will be understood that heating the water or water-containing liquid of the APT mixture, whether before or after solid APT has been added to the water or water-containing liquid, is within the scope of certain embodiments of the method according to the present disclosure. In another embodiment, the water or water-containing liquid of the APT mixture is not heated, although heating would tend to reduce the total time for conversion of the APT to AMT in the method.

Again referring to FIG. 1, method 10 further includes a step 14 including contacting the APT mixture with a cation exchange material. The objective of step 14 is to lower a pH of the APT mixture to a pH range at which a metatungstate ion is stable and at which an insoluble tungstic acid does not form in the mixture. The cation exchange material, which may be, for example, a cation exchange resin, adsorbs or otherwise traps ammonium ions in the liquid portion of the APT mixture and, in exchange, introduces hydrogen ions into the liquid portion. The hydrogen ions hydrate to hydronium ions ($H_3O^+$), which also is referred to as hydrated acid. This exchange and hydration process lowers the pH of the solution portion of the APT mixture, and the acidification of the mixture may be nearly instantaneous when the cation exchange material contacts the mixture. Since the desired pH range for step 14 is predetermined, the amount of a particular cation exchange resin that should be contacted with the APT mixture in step 14 can be calculated based on the total amount of APT originally included in the APT mixture in step 12. More specifically, a person having ordinary skill may calculate the weight or volume of a specific cation exchange resin needed in step 14 on the basis of a number of milliequivalents of the resin per milliequivalent of tungstic anhydride ($WO_3$) present in the APT. More generally, those having ordinary skill may readily determine the amount of a particular ion exchange material that should be contacted with a particular APT mixture in step 14 to adjust the pH of the mixture to a desired range.

In a non-limiting embodiment of a batch process according to the method of the present disclosure, the step of contacting the APT mixture with a cation exchange material (for example, step 14 in FIG. 1) can include adding an amount of the cation exchange material to the APT mixture, to produce a reaction mixture. The cation exchange material can be added incrementally to the APT mixture until the pH is adjusted within the desired range, or a predetermined amount of cation exchange material can be added to the APT mixture to adjust the mixture pH to the desired pH. In certain non-limiting embodiments, the cation exchange material can be mixed into the APT mixture while agitating the mixture. In one non-limiting embodiment, agitating the APT mixture can occur through all or a part of the process of adding the cation exchanger material to the APT mixture and/or after addition of the cation exchange material. A person skilled in the art will understand that agitation may be accomplished using any suitable technique such as, for example, mechanical agitation (such as stirring) or ultrasonic agitation. Such a person also will understand that agitation can decrease the time needed to dissolve solid APT in the liquid portion of the APT mixture, thereby correspondingly reducing the time to convert the APT to AMT.

Because a nearly instantaneous exchange of ions can occur when cation exchange resin is added to the APT mixture, a skilled practitioner can incrementally adjust pH to the desired range by incremental addition of the resin, without inadvertently reducing pH below the desired range. In any case, it is important to closely monitor the pH of the APT mixture when adding a cation exchange resin so that the pH is properly adjusted to the desired range. Further, it is important to properly calibrate and re-calibrate any pH electrodes or other pH measuring device that may be used to assess pH during the method. For example, pH electrodes used to measure pH during the AMT production process preferably are calibrated at least about every four in-service hours.

According to one non-limiting embodiment of the method 10 according to the present disclosure, the combination of the APT mixture and the cation exchange material is heated to increase the rate of dissolution of APT in the liquid portion of the APT mixture and, correspondingly, the rate of conversion of APT to AMT. In one non-limiting embodiment, the mixture including the cation exchange material produced in step 14 is heated to 85° C. to 95° C. In other non-limiting embodiments, the mixture including the cation exchange material is heated to 90° C. to 100° C. or, alternatively, to a temperature within the range of 70° C. to just below the boiling point of the mixture. As noted, an ordinarily skilled practitioner will understand that heating the mixture including the APT solution and the cation exchange material to a temperature above ambient temperature will assist in dissolving APT and, correspondingly, will enhance the rate of conversion of APT to AMT. In certain embodiments of the method according to the present disclosure, the mixture formed by combining the APT mixture and the cation exchange material is not heated, but in such embodiments the total time for conversion of the APT to AMT is greater than in embodiments of the method in which such heating is used.

In certain non-limiting embodiments of the method according to the present disclosure, the cation exchange material is a cation exchange resin. In certain of such non-limiting embodiments, the cation exchange resin is a strong acid cation exchange resin. A cation exchange resin generally includes an insoluble matrix material (a support structure) that is normally in the form of small (for example, 1-2 mm in diameter) beads composed of an organic polymer. The matrix material beads may have a highly developed structure of pores on the bead surface adapted to readily trap and release ions. The trapping of an ion in a pore takes place only with the simultaneous releasing of an ion from the pore, and for that reason the process carried out on the bead surface has become known as ion exchange. In certain non-limiting embodiments of the method according to the present disclosure, the cation exchange resin is a weak acid cation exchange resin, although utilizing such a resin increases the time for conversion of an amount of APT to AMT relative to an identical method utilizing a strong acid cation exchange resin.

In certain embodiments of strong cation exchange resins useful as ion exchange material in the present method, the resin is a compound including multiple units having one or more sulfonic acid groups and/or one or more phosphonic acid groups which serve as cation exchange groups. In one non-limiting embodiment, a cation exchange resin utilized in a method according to the present disclosure comprises multiple units including sulfonic acid groups. According to one such non-limiting embodiment, the resin includes sulfonic acid groups in the form of poly(2-acrylamido-2-methyl-1-propanesulfonic acid). The cation exchange groups may be bound to matrix materials in the form of, for example, a porous polymer, a gel polymer, or mixtures thereof. One particular non-limiting embodiment of a cation exchange resin is a sulfonic acid functionalized styrene-divinylbenzene gel polymer. In another non-limiting embodiment of the method according to the present disclosure, DOWEX® G-26 resin, available from The Dow Chemical Co., Midland, Mich. USA, is utilized as a strong cation exchange resin to adjust the pH of the APT mixture. DOWEX® G-26 resin includes a low metals content styrene-divinylbenzene bead gel matrix with sulfonic acid functional groups, has a mean particle size of 650±50 µm, and hydrates to a water content of about 45-52%.

Inorganic-based materials also may be used as cation exchange materials in certain embodiments of a method for making AMT according to the present disclosure. In certain of such non-limiting embodiments, cation exchange materials may include zeolites, montmorillonite, clay, and soil humus. In general, a cation exchange material useful in embodiments of the method according to the present disclosure is any cation exchange material know now or hereafter to a person having ordinary skill in the art and which can be used to suitably acidify an APT mixture according to the present method to a pH in a range in which APT converts to AMT.

Tungstate ions in acidic solution condense to isopolytungstates. Isopolytungstates are formed by adding hydronium ions ($H_3O^+$) to the tungstate ion ($WO_4^{2-}$). The various isopolytungstates have differing ratios of hydronium ion to tungstate ion, and the particular ratio of an isopolytungstate is a function of pH. The ratio of hydronium ions to tungstate ions in a tungstate ion solution increases as the solution pH decreases. APT exhibits relatively low solubility in water at a pH near 7. When a mixture of APT and water is contacted with a cation exchange material, the pH of the mixture (more precisely, the pH of the solution portion of the mixture) is lowered. As the pH of the mixture is lowered, the pH enters a range within which the metatungstate ion is stable, and the APT in solution converts to AMT. At too low a pH, insoluble tungstic acid precipitates, which results in a lower yield and contamination of the AMT product. Therefore, the pH of the APT mixture (more precisely, the pH of the liquid portion of the mixture, which includes dissolved APT) should be monitored carefully so that the pH is maintained in a range wherein metatungstate ion is stable and insoluble tungstic acid is not formed. At lower pH values within this range, the rate of conversion of APT to AMT is higher, but lower pH values also risk precipitation of insoluble tungstic acid, thereby contaminating the AMT product and reducing AMT yield. In certain non-limiting embodiments of the method according to the present disclosure, a pH range wherein the metatungstate ion is stable and insoluble tungstic acid is not formed is a pH range of 2.0 to 5.0. In other non-limiting embodiments, the pH range wherein the metatungstate ion is stable and insoluble tungstic acid is not formed is one of 3.0 to 4.0, 3.0 to 3.5, 3.3 to 3.7, and greater than 2.0 but less than 6.0. In one non-limiting embodiment of the AMT production method according to the present disclosure, a specific pH value at which the metatungstate ion is stable and insoluble tungstic acid is not formed is about 3.2. In a non-limiting embodiment, the pH is allowed to drift up to 3.8 to 3.9 by the time that the APT to AMT conversion is completed.

The method according to the present disclosure converts stoichiometric APT to AMT as follows:

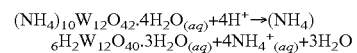

Referring again to FIG. 1, method 10 includes a step 16 of maintaining the pH of the mixture within a pH range wherein the metatungstate ion is stable and insoluble tungstic acid is not formed. The pH may be maintained in this way and the above reaction may be allowed to proceed for a period of time sufficient to convert the APT mixture to an AMT solution. In certain embodiments, the same or substantially the same pH range as utilized in step 14 may be maintained during step 16. Also, if desired, the pH of the APT mixture may be adjusted upward without contaminating the conversion of APT to AMT by adding ammonium hydroxide ($NH_4OH$) or APT to the reaction mixture. In addition, in certain non-limiting embodiments, water may be added to the reaction mixture to maintain the volume of the mixture as the APT dissolves and is converted to AMT, and the AMT is extracted.

In certain non-limiting embodiments, the method according to the present disclosure is conducted as either a batch or a continuous process, and all or substantially all of the APT included in the reaction mixture is dissolved and converted to AMT. Because it is difficult to separate solid APT from solid AMT, dissolving and converting all of the APT present in the APT mixture of methods according to the present disclosure enhances the purity and facilitates the purification of the final solid AMT product.

Again referring to FIG. 1, in the non-limiting embodiment of method 10 the cation exchange material is separated from the AMT solution in step 18 after the APT has been converted to AMT. A non-limiting embodiment of the present method includes filtering the AMT solution to separate all or a portion of the cation exchange material from the AMT solution. Other means suitable for separating AMT from an AMT solution known now or hereafter to a person having ordinary skill in the art are within the scope of embodiments according to the present disclosure.

In certain other non-limiting embodiments of methods according to the present disclosure, the cation exchange material may be provided in a porous container that allows ammonium ions to flow into the container and contact the ion exchange material, and hydrogen ions, or hydronium ions, to be freed from the ion exchange material and flow out of the container. In certain of such non-limiting embodiments, separating the cation exchange resin from the AMT solution simply entails removing the porous container from the AMT solution.

With reference again to FIG. 1, the non-limiting embodiment of method 10 further includes step 20 wherein the AMT solution is concentrated to form a concentrated AMT solution. One non-limiting embodiment of such a method involves evaporating water from the AMT solution to provide a concentrated AMT solution. One non-limiting embodiment of such a method includes evaporating water from the AMT solution by boiling the AMT solution. The concentrated AMT solution may be cooled after evaporating water from the AMT solution. In one non-limiting embodiment of method 10, step 20 involves concentrating the AMT solution until the density of the AMT solution is at least 1.8 g/mL. Other possible solution densities for the concentrated AMT solution are within the scope of embodiments disclosed herein.

Again with reference to FIG. 1, a non-limiting embodiment of method 10 includes a step 22 in which the concentrated AMT solution is filtered to remove at least a portion of any insoluble particles that may be present in the concentrated AMT solution. In certain non-limiting embodiments including the filtering step, filtering may include filtering out particles having a size of, for example, 1.0 μm or greater, or 0.5 μm or greater. In addition, other techniques suitable for separating insoluble particles or colloids, including flocculation and gravity settling, are encompassed by the present disclosure.

In the method 10 shown in FIG. 1, solid AMT is produced in a step 24 by drying the concentrated AMT solution. One non-limiting technique for drying the concentrated AMT solution is spray drying the concentrated AMT solution. Spray drying and other techniques for drying solutions to provide a solid product are well known to those having ordinary skill in the art, and details of those techniques need not be provided herein.

After the cation exchange resin is filtered from the AMT solution, the resin can be regenerated for further use using conventional techniques. In embodiments not meant to be limiting, the cation exchange resin is regenerated by exposing the cation exchange resin to a mineral acid, such as, but not limited to, sulfuric acid or nitric acid. In one non-limiting embodiment, the amount of mineral acid added to the resin is in excess of what is needed to replace all ammonium groups bound to the used resin with hydrogen ions. In another non-limiting embodiment, the used cation exchange resin is regenerated with 100-300% excess $H_2SO_4$ (75-200 mL concentrated $H_2SO_4$ solution/Kg of APT) for an exposure time of at least an hour, but usually 24 hours. After exposure to the mineral acid in the foregoing non-limiting embodiments, the cation exchange material is washed with deionized, distilled, and/or double distilled water until the water runoff attains a stable pH. The resin is then reused.

It will be understood that in certain embodiments of the AMT production method according to the present disclosure the APT mixture may be contacted with the ion exchange material in a continuous process, rather than in a batch process. One non-limiting embodiment of a continuous process includes flowing the APT mixture through a bed of a cation exchange resin or other suitable cation exchange material. The pH of the liquid portion of the APT mixture may be monitored at different locations along the bed. Optionally, means are provided at or adjacent one or more of the pH monitoring locations for adjusting and/or maintaining the pH of the solution in those locations within a range suitable for converting APT to AMT as discussed herein. In particular, the pH may be adjusted at or adjacent the one or more pH monitoring locations so as to be within a range wherein the metatungstate ion is stable and insoluble tungstic acid is not formed. In certain embodiments of such a continuous process, the effluent from the ion exchange material bed may be a substantially pure AMT solution obtained from the APT mixture after the APT is dissolved in the pH adjusted solution and converted to AMT. All pH conditions disclosed hereinabove for a batch-type process apply equally to a continuous process.

One particular non-limiting embodiment of a method for producing AMT from APT according to the present disclosure includes heating water to a temperature of 80° C. to 99° C. The water may be, for example, one or a mixture of deionized water, distilled water, and double distilled water. Solid APT is mixed into the heated water to form an APT mixture including a liquid portion that is a dilute aqueous APT solution. A sufficient amount of strong acid cation exchange resin is added to the APT mixture to adjust a pH of the liquid portion of the APT mixture to 3.0 to 5.0. The combined cation exchange resin and APT mixture is heated to 80° C. to 100° C., and the pH of the liquid portion is maintained at 3.0 to 5.0, or more preferably at 3.0 to 3.5, until substantially all of the APT mixture is converted to an AMT solution. The cation exchange material is then separated from the AMT solution, and the solution is concentrated to form a concentrated AMT solution. The concentrated AMT solution is filtered to remove all or a portion of insoluble particles and dried to obtain solid AMT.

The environmental impact and costs associated with methods for converting APT to AMT according to the present disclosure may be reduced by regenerating and reusing cation exchange material and/or by recycling water used in the method. In one non-limiting embodiment according to the present disclosure, for example, the method my involve a closed loop process flow cycle in which DOWER® G-26 ion exchange resin is continuously regenerated and reused to convert APT to AMT.

Several examples illustrating certain non-limiting embodiments according to the present disclosure follow.

Example 1

Before beginning the process to convert APT to AMT, a conventional pH, probe was calibrated using standard solutions at pH 4 and 7. 3000 mL of double distilled water was heated to 90-95° C. Approximately 250 g of APT powder was added to the hot water, and the mixture was stirred using a stir bar. DOWEX® G-26 cation exchange resin was added incrementally in portions of approximately 10 g until the pH of the liquid portion of the APT/water mixture was between 3 and 4. The total volume of resin necessary to reach a pH between 3 and 4 was approximately 675 mL resin/Kg APT. As the APT dissolved in the acidified water, it reacted to form AMT, thereby allowing more APT to dissolve in the solution and drive the conversion of the APT toward completion. The dissolution and reaction of the APT initially occurred relatively quickly. As the reaction proceeded the reaction mixture changed from an opaque white slurry to a clear, slightly yellow or amber solution. When the solution appeared clear, indicating that substantially all of the APT had been converted, additional APT was added in two 250 g increments until the solution contained 750 g APT (250 g/L). The 750 g of APT reacted in the process (250 g initially+500 g added) was dissolved and converted to AMT in approximately 90 minutes.

Example 2

AMT was prepared from solid APT and water as described in Example 1, except that a total of 1050 g of APT was incrementally dissolved in 3000 mL of hot water (350 g/L). The time to convert all of the APT to AMT was about 6 hours. Although the complete conversion required 6 hours, the 350 g/L concentration of the APT mixture was well below the solubility of AMT in water, which is about 1635 g/L at 22° C.

Example 3

The AMT solution prepared in Example 1 was filtered in an 18 cm diameter Büchner funnel to remove the cation exchange resin from the solution. The filtrate was then concentrated via evaporation at approximately 100° C. (boiling) until the solution density was 1.8 g/mL, thereby providing a concentrated AMT solution. The pH of the solution tends to become more acidic during evaporation. In order to prevent the solution from becoming overly acidic, and to prevent the precipitation of insoluble tungstic oxide, ammonium hydroxide ($NH_4OH$) solution (10 mL of concentrated ammonium hydroxide diluted with double distilled water to 100 mL) was added dropwise using a pipette to maintain the AMT solution at a pH between 3 and 4. The ammonium hydroxide solution should not be added too quickly, as sudden localized fluctuations in pH may cause precipitation of insoluble tungstic oxide. The concentrated AMT solution was cooled. As necessary, the pH of the cooled concentrated AMT solution was adjusted to 3.5 with the ammonium hydroxide solution. The concentrated AMT solution was filtered to remove insoluble particles. The mass of insoluble particles was about 5 g. X-ray elemental analysis of the insoluble material showed that the insoluble material was composed mainly of tungsten and oxygen. The resulting solution had a clear amber appearance. The solution was stored until it was spray dried. Taking into account the loss of material due to handling and the material used for lab samples, the overall yield for the conversion of APT to AMT was approximately 99%.

While conducting the above-described examples, it was observed that it may be important to prevent the cation exchange resin and AMT solution from contacting metal containers, such as carbon steel containers. Cation exchange resin soaked with double distilled water and placed in a carbon steel container for several days was observed to absorb iron from the container. This contaminated the AMT product for several cycles, i.e., after regeneration and reuse of the cation exchange resin. The regenerated resin previously in contact with carbon steel was found to have a high iron content. Iron was not found in new resin that was not placed in a carbon steel container. Resins in contact with stainless steel containers did not exhibit iron pickup.

While conducting the above-described examples, it also was observed that the pH measuring apparatus should be recalibrated frequently, such as before daily use and every four hours thereafter. Although the reaction converting APT to AMT will still occur at pH outside those discussed herein, insoluble tungstic acid may precipitate in the reaction mixture and thereby contaminate the AMT product. The conversion of APT to AMT occurs faster at lower pH, and this requires balancing a fast reaction time with the objective of preventing contamination with tungstic acid. It appears that an optimum pH is below 3.5, but is not less than 3.0. Near the end of the conversion, however, the pH of the APT mixture may be allowed to rise to about 3.9-4.0. Allowing the pH to rise to about 3.9-4.0 near the end of the conversion minimizes the amount of ammonium hydroxide solution that may need to be added during the subsequent concentrating step. During boiling the AMT solution for concentration, the pH becomes more acidic. Ammonium hydroxide solution may need to be added to the boiling AMT solution to keep the pH of the AMT solution from dropping below 3.0.

Example 4

AMT was prepared from solid APT and water as described in Example 3. Individual batches were prepared at different times, and each batch of AMT was analyzed for contaminant concentrations. After the analyses, the batches were combined into a "Bulk Sample". Elemental analyses for each batch and for the Bulk Sample are provided in Table 1. Atomic absorption spectroscopy was used for detection of sodium, potassium, zinc, and magnesium. Direct current plasma emission spectroscopy was used for detection of the remaining listed elements.

TABLE 1

|    | Batch 1 | Batch 2 | Batch 3 | Batch 4 | Batch 5 | Bulk Sample |
|----|---------|---------|---------|---------|---------|-------------|
| Cr | 0.0004  | 0.0004  | 0.0004  | 0.0004  | 0.0004  | 0.0004      |
| Fe | 00008   | 0.0017  | 0.0012  | 0.0010  | 0.0007  | 0.0010      |
| Ni | 0.0008  | 0.0008  | 0.0007  | 0.0004  | 0.0006  | 0.0008      |
| Mo | 0.0009  | 0.0007  | 0.0009  | 0.0009  | 0.0010  | 0.0010      |
| Co | 0.0007  | 0.0005  | 0.0004  | 0.0006  | 0.0004  | 0.0003      |
| Al | 0.0005  | 0.0004  | 0.0004  | 0.0004  | 0.0004  | 0.0005      |
| Cu | 0.0001  | 0.0002  | 0.0001  | 0.0001  | 0.0001  | 0.0002      |
| Si | 0.0021  | 0.0029  | 0.0025  | 0.0016  | 0.0020  | 0.0015      |
| Ca | 0.0003  | 0.0004  | 0.0004  | 0.0004  | 0.0003  | 0.0005      |
| P  | 0.0013  | 0.0014  | 0.0014  | 0.0015  | 0.0027  | 0.0017      |
| Na | 0.0004  | 0.0007  | 0.0006  | 0.0007  | 0.0005  | 0.0004      |
| K  | 0.0015  | 0.0008  | 0.0007  | 0.0005  | 0.0028  | 0.0012      |
| Zn | 0.0003  | 0.0003  | 0.0004  | 0.0004  | 0.0003  | 0.0004      |
| Mg | 0.0001  | 0.0002  | 0.0001  | 0.0001  | 0.0001  | 0.0001      |

Example 5

A concentrated aqueous solution of the Bulk Sample from Example 4 was spray dried. 10.5 L of the concentrated Bulk Sample AMT solution contained approximately 10.5 kg of AMT. The concentrated AMT solution was spray dried on a 3 foot NIRO® spray dryer. The inlet temperature of the spray dryer was held between 220° C. and 250° C., and the outlet temperature was held between 82° C. and 86° C.

After spray drying a portion of the concentrated AMT solution, the spray dried AMT powder was redissolved in double distilled water. Upon redissolution, the AMT solution was visually turbid. A turbidity measurement of the redissolved AMT solution yielded a value of 104, compared with a value of 32 for the concentrated AMT solution prior to spray drying. It was determined that the spray dryer was not sufficiently cleaned prior to spray drying the concentrated AMT solution. Spray drying was halted, the spray drier was cleaned, and the process was resumed. Turbidity measurements of a solution of spray dried AMT collected after cleaning the spray drier indicated some continuing contamination of the AMT, but the turbidity of the solution of redissolved spay dried AMT gradually lessened to about 50, indicating a reduced level of contamination.

Example 6

Most of the spray dried AMT, as described in Example 5, was redissolved in double distilled water, with a small portion being withheld for analytical testing. The redissolved AMT solution was visually turbid. The solution was filtered. The filtration appeared to be effective as the appearance of filtrate had a transparent amber color that was similar to concentrated AMT solution before spray drying. The turbidity measurements of the filtrate were comparable to the initial concentrated AMT solution. The filtered AMT solution was spray dried, and about 5.5 kg of solid AMT was collected. Portions of the spray dried solid AMT were dissolved in double distilled water and these solutions had turbidity readings of about 30. An additional amount of about 1.7 kg of material was collected during cleanout of the spray drier. A solution prepared from the cleanout material had turbidity reading of 43. The cleanout material was stored separate from the 5.5 kg of spray dried AMT initially collected to avoid any contamination with the higher purity sample. Several kilograms of AMT were lost during the cleanout procedure. The sprayed AMT powder had a water content of 1.8 wt. %.

Table 2 provides chemical analyses of the AMT before and after spray drying. The values before and after spray drying vary little, indicating that the filtration removed the contaminants from the spray drying and that the contaminants were not water soluble.

TABLE 2

| Element | Wt. % before spray drying | Wt. % after spray drying | Element | Wt. % before spray drying | Wt. % after spray drying |
|---|---|---|---|---|---|
| Cr | 0.0004 | 0.0004 | Si | 0.0015 | 0.0014 |
| Fe | 0.0010 | 0.0016 | Ca | 0.0005 | 0.0005 |
| Ni | 0.0008 | 0.0010 | P | 0.0017 | 0.0018 |
| Mo | 0.0010 | 0.0007 | Na | 0.0004 | 0.0007 |
| Co | 0.0003 | 0.0004 | K | 0.0012 | 0.0013 |
| Al | 0.0005 | 0.0003 | Zn | 0.0004 | 0.0008 |
| Cu | 0.0002 | 0.0002 | Mg | 0.0001 | 0.0001 |

Table 3 lists certain measured properties of the spray dried AMT powder

TABLE 3

| Property | Experimental AMT |
|---|---|
| $WO_3$ Content | 91.5% |
| Ignition Loss (750° C.) | 8.4% |
| Heavy Metals (sum of Al, As, Cu, Fe, Mg, Mo, P, Pb, Zn) | 0.0059% |
| Non-Volatiles (sum of K, Na, Ca, and Si) | 0.0043% |
| pH of 30% aqueous solution | 2.85 |
| Insolubles | 0.0053% |

Figure 3:
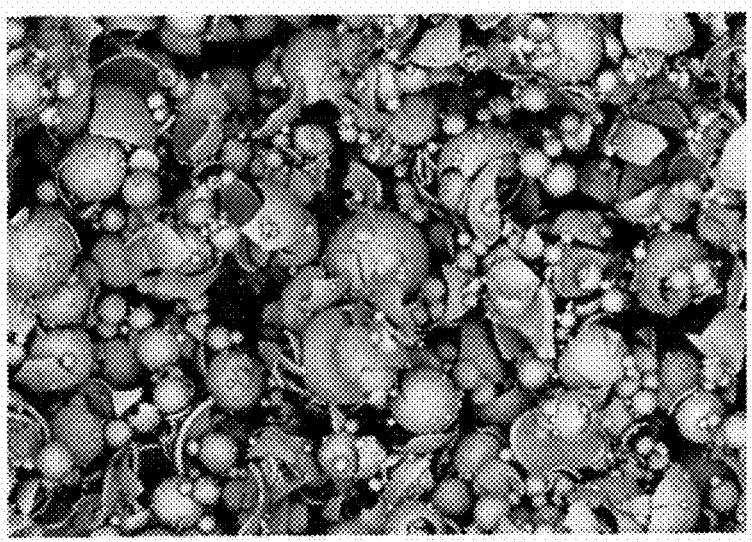
FIG. 3 is an SEM image of spray dried AMT powder produced according to embodiments disclosed herein.

FIG. 3 is a scanning electron micrograph (SEM) of a representative sample of the spray dried AMT. Spray drying the concentrated AMT solution appears to have produced hollow spheres of AMT ranging from a few microns to about 60 microns in diameter. The larger spheres are mostly broken. No inorganic contaminants were detected by X-ray elemental analysis in either the 5.5 kg of AMT or the initially sprayed, visually contaminated powder.

Example 7

3.3 L of water was heated to about 85° C. 1 kg of APT was added to the hot water and slurried. 638 mL of resin was added per kg of APT to adjust the pH between 3.0 and 3.5. The metatungstate ion is stable at this pH. The slurry was heated to 85-95° C. to increase the APT solubility and decrease the reaction time. Water was added to maintain a constant concentration during the reaction process, which took about 2 hours. After the reaction was complete, the AMT solution was separated from the ion exchange resin by filtering, and concentrated via evaporation. A high concentration of APT in the starting material is desirable to increase throughput and minimize evaporation time. Preferably, all of the APT is reacted in the process due to the difficulty of separating dissolved but unreacted APT. After sufficient water was evaporated, the concentrated solution was filtered again to remove 0.5 µm to 1.0 µm particles and the pH was checked. The solid AMT was dried.

Example 8

Certain cation exchange resins used in the conversion of APT to AMT according to the present disclosure can be regenerated. The resin is separated from the AMT solution and washed with a suitable acid to replace ammonium ions bound to the resin particles with hydrogen ions. The capability to regenerate and reuse a cation exchange resin may be important given resin cost and the abrasive nature of the non-solubilized APT particles present in reaction mixture during the conversion to AMT.

Figure 4:
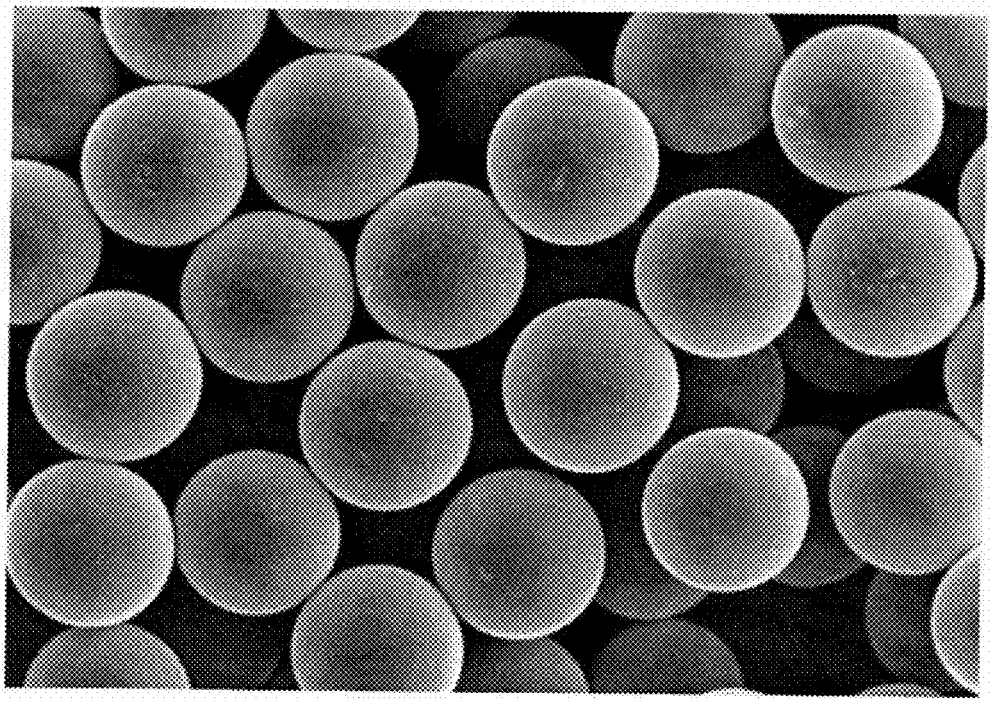
FIG. 4 is an SEM image of as-received DOWER® G-26 ion exchange resin beads.
Figure 5:
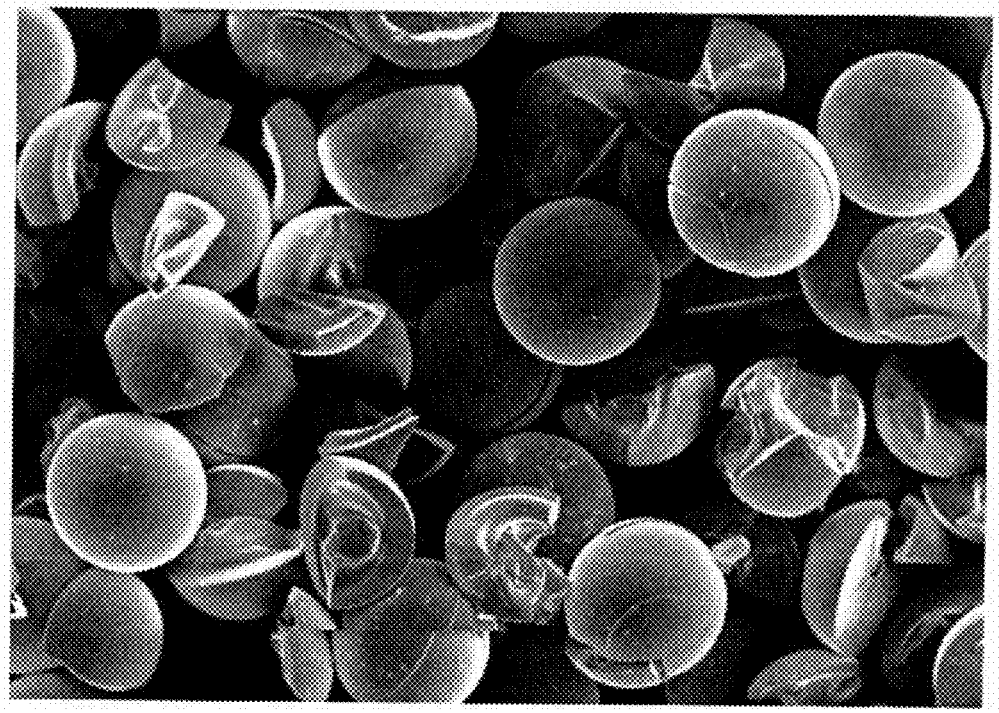
FIG. 5 is an SEM image of DOWEX® G-26 ion resin beads after two months of use in one non-limiting embodiment of an AMT production method according to the present disclosure.

Scanning electron micrographs (SEM) were taken of (1) a sample of as-received DOWEX® G-26 cation exchange resin (FIG. 4) and (2) the same resin after an extended period of use in conversion of APT to AMT by the method according to the present disclosure (FIG. 5). The SEM of FIG. 5 shows that many of the resin beads had fractured, likely due to stirring of the reaction mixture and the abrasive nature of the undissolved APT. It is anticipated that gentler mixing, as would occur in a larger-scale operation, will result in less fracture of the resin beads. Fracture of resin beads will increase the pressure necessary to pump wash water and regenerative acid through the resin. However, it was observed that used fractured resin may still be regenerated and reused in the conversion method according to the present disclosure.

The DOWEX® G-26 cation exchange resin was successfully regenerated by soaking the beads in 100-300% excess $H_2SO_4$ (75-200 mL concentrated $H_2SO_4$ solution/Kg APT) for a suitable time, which is at least an hour but more preferably 24 hours. The acid was then filtered from the resin using a Büchner funnel, and the resin was washed with double distilled water. The acid was neutralized and discarded.

It will be understood that the present description illustrates those aspects of the invention relevant to a clear understanding of the invention. Certain aspects that would be apparent to those of ordinary skill in the art and that, therefore, would not facilitate a better understanding of the invention have not been presented in order to simplify the present description. Although only a limited number of embodiments of the present invention are necessarily described herein, one of ordinary skill in the art will, upon considering the foregoing description, recognize that many modifications and variations of the invention may be employed. All such variations and modifications of the invention are intended to be covered by the foregoing description and the following claims.

I claim:

1. A method, comprising:
   preparing an ammonium paratungstate mixture comprising solid stoichiometric ammonium paratungstate and water;
   contacting the ammonium paratungstate mixture with a cation exchange material and thereby lowering a pH of the mixture to within a pH range at which a metatungstate ion is stable and an insoluble tungstic acid is not formed; and
   maintaining the pH of the mixture within the pH range for a time period sufficient to convert substantially all of the ammonium paratungstate mixture to a solution comprising ammonium metatungstate.

2. The method of claim 1, wherein the water comprises at least one of deionized water, distilled water, and double distilled water.

3. The method of claim 1, wherein preparing an ammonium paratungstate mixture comprises mixing ingredients comprising solid stoichiometric ammonium paratungstate and water having a temperature of 80° C. to 99° C.

4. The method of claim 1, further comprising heating the ammonium paratungstate mixture to a temperature of 85° C. to 95° C.

5. The method of claim 1, wherein contacting the ammonium paratungstate mixture with a cation exchange material comprises mixing the cation exchange material with the ammonium paratungstate mixture.

6. The method of claim 5, further comprising agitating the cation exchange material and the ammonium paratungstate mixture.

7. The method of claim 1, wherein the pH range is 2.0 to 5.0.

8. The method of claim 1, wherein the pH range is 3.0 to 4.0.

9. The method of claim 1, wherein the pH range is 3.0 to 3.5.

10. The method of claim 1, wherein the cation exchange material comprises a cation exchange resin.

11. The method of claim 10, wherein the cation exchange resin comprises a strong acid cation exchange resin.

12. The method of claim 11, wherein the strong acid cation exchange resin comprises at least one of a compound including a sulfonic acid group and a compound including a phosphonic acid group.

13. The method of claim 1, further comprising separating the cation exchange material from the solution comprising ammonium metatungstate.

14. The method of claim 13, wherein separating the cation exchange material from the solution comprising ammonium metatungstate comprises filtering the solution comprising ammonium metatungstate.

15. The method of claim 14, further comprising concentrating the solution comprising ammonium metatungstate to form a concentrated ammonium metatungstate solution.

16. The method of claim 15, wherein concentrating the solution comprising ammonium metatungstate comprises boiling the solution comprising ammonium metatungstate.

17. The method of claim 15, further comprising filtering the concentrated ammonium metatungstate solution to remove at least a portion of insoluble residual particles from the concentrated ammonium metatungstate solution.

18. The method of claim 17, further comprising drying the concentrated ammonium metatungstate solution.

19. The method of claim 18, wherein drying the concentrated ammonium metatungstate solution comprises spray drying the concentrated ammonium metatungstate solution.

20. A method for producing ammonium metatungstate from ammonium paratungstate, the method comprising:
    mixing ingredients comprising solid stoichiometric ammonium paratungstate and water at a temperature of 80° C. to 99° C. to provide an ammonium paratungstate mixture;
    combining an amount of strong acid cation exchange resin and the ammonium paratungstate mixture to adjust a pH of the mixture to 3 to 5;
    heating the ammonium paratungstate mixture to 80° C. to 100° C.;
    maintaining the pH of the ammonium paratungstate mixture at 3 to 5 until substantially all of the ammonium paratungstate mixture is converted to an ammonium metatungstate solution;
    separating the cation exchange resin from the ammonium metatungstate solution;
    concentrating the ammonium metatungstate solution to form a concentrated solution;
    filtering the concentrated solution to remove at least a portion of insoluble particles from the concentrated solution; and
    drying the concentrated solution to obtain solid ammonium metatungstate.

21. The method of claim 20 wherein the water comprises deionized water, distilled water, or double distilled water.

22. The method of claim 20, wherein:
    the amount of strong acid cation exchange resin adjusts the pH of the mixture to 3.0 to 3.5; and
    the pH of the ammonium paratungstate mixture is maintained at 3.0 to 3.5 until substantially all of the ammonium paratungstate mixture is converted to an ammonium metatungstate solution.

* * * * *